April 5, 1932.  J. F. MERKEL  1,852,358
ADJUSTABLE REACTOR
Filed Dec. 7, 1928
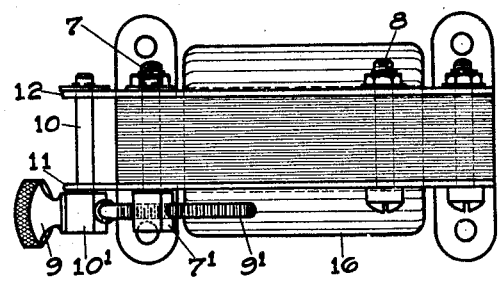
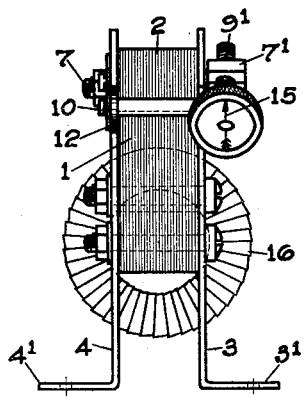
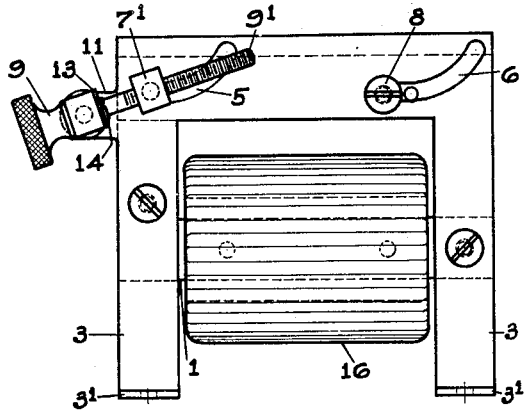
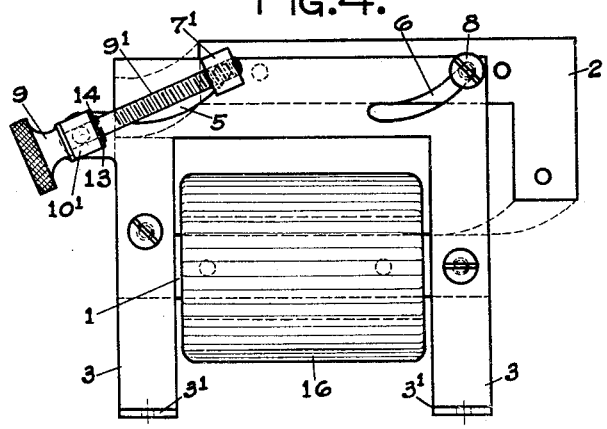

Patented Apr. 5, 1932

1,852,358

UNITED STATES PATENT OFFICE

JOSEPH F. MERKEL, OF ROCHESTER, NEW YORK, ASSIGNOR TO GENERAL RAILWAY SIGNAL COMPANY, OF ROCHESTER, NEW YORK

ADJUSTABLE REACTOR

Application filed December 7, 1928. Serial No. 324,551.

This invention relates to adjustable reactors, and more particularly to reactors used in series with an alternating source of potential to limit the flow of current in circuits of railway signalling systems.

A normally closed type track circuit consists of a section of track divided from the rest of the track by insulating joints, having a track relay connected across one end thereof and having a source of current connected in series with suitable current limiting means and connected across rails at the other end of such a section. Track circuits of this type may be either alternating current or direct current track circuits, and in each case the current limiting device has the important function of saving energy when there is a train on the track circuit and the function of reducing the voltage embodying across the track rail as the train on the section approaches the energized end of the track circuit. In track circuits of this type it is experienced that the resistance from rail to rail through the ground or ballast, known as the ballast resistance, is variable depending on temperature and moisture. For the foregoing reasons it is important that the current limiting device be readily and micrometrically adjustable, so that it may be accurately adjusted to give the best results for the different seasons of the year.

Further a charging circuit for a storage battery consists of a source of potential having in series with it a rectifier, a current limiting device and the battery to be charged. Since storage batteries vary in ampere-hour capacity, their charging rates should be regulated accordingly. Also if the charging circuit is one of the so-called "trickle charge" type, the rate should be regulated according to the demand for energy made upon the battery under charge. Thus it is seen, that the current limiting device becomes an important factor, which should consume as little energy as possible and still give an even and accurate adjustment over the range necessary for any one assumed circuit, and the present invention may be applied to this field of use.

In view of the foregoing and other important considerations, it is proposed in accordance with the present invention to provide current limiting means comprising a core of laminated magnetic material of which the reluctance of the core is variable in two different ways, namely, by changing the area of contact between core portions and by changing the air gap between such core portions. More specifically it is proposed to provide adjustable means whereby the core portions may be shifted with respect to each other in such a manner that uniform movement of manually operable means results in a uniform change of reactance in a coil linking the magnetic circuit through the two core portions in series. Another object of the present invention is the provision of manually operable means having an indicator associated therewith whereby the extent of manual movement and the reactance of the current limiting means may be accurately determined.

Other objects, purposes and characteristic features of the present invention will appear in part from the accompanying drawings and in part as the description thereof progresses.

In describing the invention in detail reference will be made to the accompanying drawings in which:—

Fig. 1 shows a side elevation of one embodiment of a reactor according to the present invention;

Fig. 2 shows a plan view of the reactor shown in Fig. 1;

Fig. 3 shows an end view of said reactor; and

Fig. 4 shows a side elevation similar to Fig. 1 except that the adjustable core is shown in its extreme extended position.

Referring to the drawings, the particular embodiment of the invention illustrated comprises two L-shaped cores 1 and 2, which in the form shown when in their minimum reluctance position have the long legs of one of these members extending along the end of the short leg of the other member. The core member 1 of laminated magnetic material is clamped between inverted U-shaped side plates 3 and 4, which have their ends bent back to form feet $3^1$ and $4^1$. These side plates or members are of such size that the upper edges thereof project above the upper edges of movable member 2, when such movable member is in its minimum reluctance position.

The upper horizontal portion of the side plates 3 and 4 are provided with curved slots 5 and 6 through which bolts 7 and 8 pass. These bolts also pass through the movable core member 2. These slots 5 and 6 are identical in shape and are of uniform width equal to the diameter of these bolts so as to permit the bolts 7 and 8, which may slide along the edge of these slots, to move through only one path of a curvature the same as that of these slots. It is thus seen that movement of the movable core member 2 through its permissible path as determined by the slots 5 and 6 is always parallelly disposed with respect to the stationary core member 1.

The bolt 7 is provided with an enlarged square head $7^1$ which is cross-drilled and threaded to receive the threaded shank $9^1$ of the adjusting knob 9. This adjusting knob is pivotally supported in the square head $10^1$ of a shaft 10, which shaft 10 is pivotally supported in perforated ears 11 and 12 extending from the side plates 3 and 4. The shank of the adjustable knob contains a washer 13, which is held in position by a cross-pin 14, so that this shank cannot move longitudinally within its bearing block comprising head $10^1$ of the shaft 10.

It is thus seen that rotary movement of the knurled knob 9, the extent of movement of which may be determined by the arrow mark 15 on said knob, causes the core member 2 to slide in the curved slots 5 and 6. The shape of the curved slots 5 and 6 is such that the change of reactance of the coil 16 is always directly proportional to the extent of movement of the knob 9. In other words, each rotation of the knob 9 changes the reactance of the coil 16 in ohms to the same extent irrespective of the position of the bolts 7 and 8 in the slots 5 and 6. Putting it still differently, the ratio of rotation of knob 9 to the reactance of coil 16 is a fixed value for all positions of core member 2, that is, they have a straight line relation.

The arrow 15 enables the maintainer to count the number of turns he wishes to make, or has made, and enables him to make a record of the adjustment a particular reactor on the railroad assumed during a certain season, so that the same adjustment of the reactor may be made in the same season of a following year. Also, if desired, the adjustable reactor embodying the present invention may have such number of turns in its coil 16 that each turn of the knob 9 changes the reactance exactly one ohm, or a particular fraction of an ohm. The exact adjustment of the reactor embodying the present invention is indicated at all times and may be definitely ascertained by counting the number of threads on the shank $9^1$ projecting beyond the head $7^1$.

Although the present invention is particularly adaptable for use in a normally closed alternating current track circuit, it is useful in certain other circuit combinations such as in the input circuit of a trickle charger for railway track circuit batteries.

Having thus shown and described one rather specific embodiment of the present invention, and having shown its construction rather specifically, it is desired to be understood that this has been done for the purpose of describing the invention rather than illustrating the exact construction preferably employed in carrying out the invention, and that further changes, modifications, and additions may be made in practicing the invention without departing from the spirit or scope thereof, or the idea now underlying the same, except as demanded by the scope of the following claims.

What I claim is:—

1. An adjustable reactor comprising, two separable core members, a coil on one of said members, interengageable means for fixing the path through which one of said members may be moved with respect to the other to a curved path, a manually operable means for moving said one member in said path, and means for indicating the adjusted position of said manually operable means said curved path restraining the cores to substantially slide, one upon the other, without opening a gap therebetween, at the beginning of the adjustment, and subsequently to rapidly open a gap between the cores.

2. An adjustable reactor comprising, two separable core members, a coil on one of said members, interengageable means for fixing the path through which one of said members may be moved with respect to the other to a curved path, and a manually operable means for moving said one member in said path constructed and arranged so that uniform movement of said manually operable means effects uniform change in the reactance in said coil.

In testimony whereof I affix my signature.

JOSEPH F. MERKEL.